United States Patent [19]

Humphrey et al.

[11] 4,311,630

[45] Jan. 19, 1982

[54] GASIFIABLE CARBON-GRAPHITE FIBERS

[75] Inventors: Marshall F. Humphrey, Duarte; Kumar N. R. Ramohalli, Pasadena; Warren L. Dowler, Sierra Madre, all of Calif.

[73] Assignee: California Institute of Technology, Pasadena, Calif.

[21] Appl. No.: 30,836

[22] Filed: Apr. 17, 1979

[51] Int. Cl.$^3$ .............................................. C08L 61/06
[52] U.S. Cl. ................................ 260/38; 260/37 EP; 260/37 N; 260/37 SB; 260/40 R
[58] Field of Search ................ 260/37 EP, 37 SB, 38, 260/40 R, 37 N; 106/307; 427/215, 35, 37; 428/367, DIG. 902, DIG. 903

[56] References Cited

U.S. PATENT DOCUMENTS

| | | | |
|---|---|---|---|
| 3,767,774 | 10/1973 | Hou | 106/307 |
| 3,833,402 | 9/1974 | Elban et al. | 428/367 |
| 3,876,444 | 4/1975 | McKee | 428/367 |
| 4,146,668 | 3/1979 | Dorey et al. | 428/367 |

Primary Examiner—Lewis T. Jacobs
Attorney, Agent, or Firm—Marvin E. Jacobs

[57] ABSTRACT

Fine, carbon-graphite fibers do not combust during the combustion of a composite and are expelled into the air as fine conductive particles. Coating of the fibers with a salt of a metal having a work function below 4.2 eV such as an alkaline earth metal salt, e.g., calcium acetate, catalytically enhances combustion of the fibers at temperatures below 1000° C. such that the fibers self-support combustion and burn to produce a non-conductive ash. Fire-polishing the fibers before application of the coating is desirable to remove sizing to expose the carbon surface to the catalyst.

14 Claims, 2 Drawing Figures

GASIFIABLE CARBON-GRAPHITE FIBERS

DESCRIPTION

Origin of the Invention

The invention described herein was made in the performance of work under a NASA contract and is subject to the provisions of Section 305 of the National Aeronautics and Space Act of 1958, Public Law 83-568 (72 Stat. 435; 42 USC 2457).

TECHNICAL FIELD

The present invention relates to coated carbon-graphite fibers and, more particularly, to such fibers containing a catalytic coating capable of combustion of such fibers in a burning composite.

BACKGROUND ART

Considerable interest exists in the future use of carbon-graphite fibers due to their light weight and high strength. Presently, about 30 pounds of graphite are being utilized per plane in manufacture of several existing aircraft and future projected use is 1000 lbs/aircraft. Due to the need to reduce weight of automobiles to increase fuel efficiency, use in cars is also expected to increase dramatically over the next decade. The projected annual use of graphite fibers by 1990 is as follows:

TABLE 1

| Industry | Pounds |
|---|---|
| Aerospace | $10^6$ |
| Automobile | $10^9$ |
| Consumer | $10^6$ |

Commercial carbon fiber is usually sold as a stranded material or as a woven cloth, having from 100 to 10,000 discrete thin fibers per strand. These fibers are prepared by heating a precursor such as rayon, pitch or polyacrylonitrile fiber to carbonize the fibers followed by a high temperature (2000°–3000° C.) graphitization treatment in absence of oxygen during which it is believed that the carbon atoms rearrange into a hexagonal structure. The industry has developed fine strand multifilament products as the result of difficulties in manufacturing large diameter fiber of sufficiently high molulus. It will be noted that an extremely small fiber diameter is now the industry standard, and is not predicted to change very much in the immediate future:

Carbon Fiber Diameter—6.5 to 13 microns
Modulus—50 million psi
Fall Rate—about 2 cm/sec.
Resistivity—1000 ohms/cm.
Burnout—0.5 to 1.0 watt/cm.
Contact Voltage Drop—2 to 5 volts Recently a significant hazard has been recognized that could prevent the widespread use of graphite fibers. The fine fibers are conductive and are not oxidized nor vaporized at the temperatures experienced during a typical fire. During a fire the epoxy resin binder is consumed at 400°–600° C. Fine graphite fibers and fragments are expelled from the composite, are entrained in the air and form aerosols. The aerosols can travel significant distances, invade or settle in unprotected electrical or electronic equipment and cause shorting, equipment failure, power failure and blackouts. Automobile fires are quite a common event and aircraft fires occur frequently. Such an event could cause disastrous consequences at or near airport, industrial or residential areas.

Since the surface temperature of combustion (fast oxidation) of graphite is in the vicinity of 1300° C., fast oxidation of graphite is hardly reached by the simple combustion of a composite panel which occurs at typical surface temperature of 400°–500° C. Also, even if the requisite temperatures are reached, the rates of combustion (oxidation) are too low compared to the same rates for the resin. This has the practical implication that the resin burns away fast leaving behind the graphite fibers that do not combust in the absence of the supporting flame. The fiber diameter of $8\mu$ presents a 2500 $cm^2$ surface area per gram of mass. This is very large and leads to rapid heat loss and is conducive to early extinction even if the combustion is initiated.

An additional property of the carbon fiber is the "red heat" behavior. It should be emphasized that in a shorting situation a single carbon fiber is most difficult to burn or consume. Rather the literature suggests that the carbon fiber becomes a glowing filament and does not pyrolyze or burn at least to about 2300° K. And even above that temperature adequate air circulation is required to consume the fiber fully. A minimum of 16 grams of oxygen are needed to consume 12 grams of carbon, and hence in a closed area such as in the chassis of an electronic system, lack of air circulation and sufficiently high voltages may cause the fibers to develop a "red heat" condition and ignite adjacent flammable plastics and the like.

In order to permit such widespread use of graphite composites, the recognized electrical hazards must be overcome economically without sacrificing or compromising the proven good features (strength, weight and cost). This aim should preferably be achieved so that the fiber and composite are compatible with state of the art processing and equipment. Furthermore, modification of the fiber by coating or treatment must provide a good bond to the fiber and to the resin matrix.

There have been many proposals to prevent release of electrically conducting graphite fragments from composites in a fire situation. Some approaches have been to gasify the fibers by oxidation or hydrogenation, clump or retain the fibers so that they do not become airborne, insulate the fibers so no hazards are caused even if the fibers are airborne, resin modifications, alternate fibers, secondary fiber inclusions or larger fibers which would be too heavy for aerosol formation.

Most of these approaches would require several years of investigation at considerable cost, would necessitate requalification of the composite estimated to require several years and would result in substantial modification of properties of the composite and processing techniques for fabricating composites.

STATEMENT OF INVENTION

Coating of carbon-graphite fibers with a salt of a metal having a work function below 4.2 eV such as an alkaline earth metal salt catalytically enhances combustion of the fibers at temperatures below 1000° C. such that the fibers self-support combustion and burn to produce a non-conductive ash even in the absence of an external flame. The mechanical properties of the fibers and of the composite are not affected by the presence of the coating. The coating is present in an amount of 0.1 to 10% by weight which does not entail a significant weight penalty. The coating is compatible with binder resins and its presence does not require modification of state-of-the-art fiber and composite processing techniques nor fabrication equipment. This will facilitate quick transfer of the technology to industrial practice.

These and many other features and attendant advantages of the invention will become readily apparent as the invention becomes better understood by reference to the following detailed description when considered in conjunction with the accompanying drawings.

DETAILED DESCRIPTION OF THE INVENTION

Figure 1:
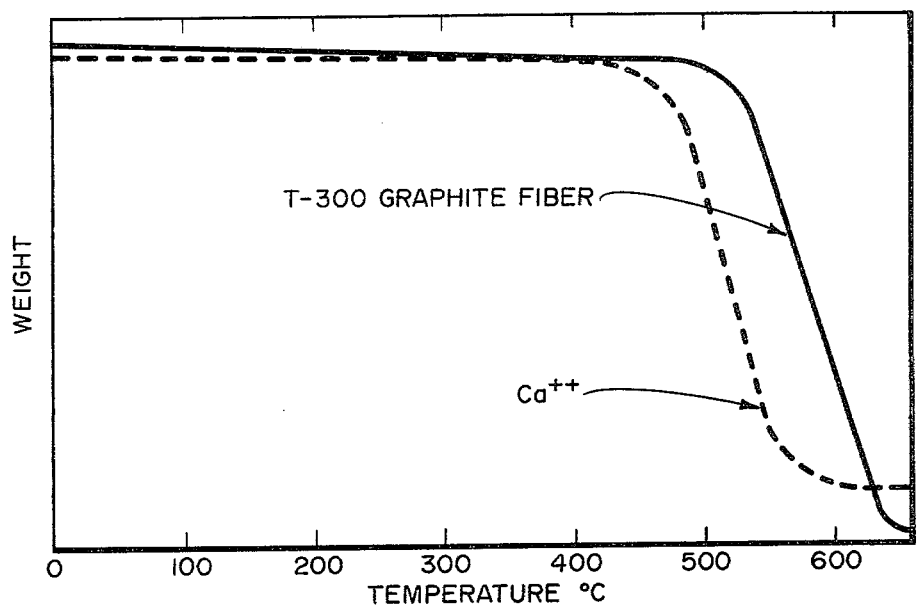
FIG. 1 is a series of thermal gravimetric analysis curves.

The catalytic coatings in accordance with this invention are salts of electronegative metals having a work function less than 4.2 eV. The metals can be selected from Groups I to VIII of the Periodic Table. However, the most cost effective catalysts are the alkaline earth metals, particularly barium, calcium and strontium. The anions can be inorganic or organic except for the anions that are fire suppressants such as fluorine, bromine, iodine, chlorine, phosphate or borate. Typical anions are carbonate, nitrate, hydroxyl, sulfate or salts of organic acids containing from 2 to 20 carbon atoms such as acetates, gluconates, acrylates, tartrates, acetoacetonates or mixtures thereof.

The coating is present in an amount from at least 0.1% to provide significant catalytic combustion enhancement and amounts above 10% add too much weight penalty by weight to the fiber. Generally, effective gasification can be achieved with from 0.5 to 5% by weight of the catalyst. It has further been discovered that the rate of gasification is further enhanced by adding from 0.1 to 20% by weight of the catalyst to the binder resin of the composite.

The coating should be applied directly to the surface of the fiber. Therefore any coating on the fiber such as polyvinyl alcohol sizing should be removed by pretreating the fiber in an inert gas arc or plasma under vacuum. This improves the catalytic effect and the mechanical properties of the composite by insuring an even coating firmly adhered to the surface of the fiber. The fibers are carbon-graphite monofilaments containing from at least 10% graphite up to 100% graphite. The graphite forms a conductive coating on the exterior surface of the fibers. The graphite fibers have a diameter of at least 1 micron. Fibers having diameter above 30 microns are too heavy to entrain in air. The fibers are usually provided as a multifilament yarn containing 100 to 3000 filaments per strand and can be woven into cloth.

The coating can be applied to the fiber by dipping, boiling, ion plating, vapor deposition, sputtering or since the fiber is conductive by electrodeposition. For reasons of economics and ease of application the coating is preferably applied to the fiber from a solution of the catalytic metal salt followed by evaporation of the solvent to deposit a coating of the salt on the surface of the fiber. The fiber should be observed to assure that salt crystals have not deposited on the surface. The solution can be a dilute solution containing as little as 0.1 to 10 mole percent or concentrated solutions up to saturation can be utilized. The solution can be applied by dipping the fiber into a bath of the solution or by brushing or spraying the solution onto the fiber whether in monofilament, multifilament, strand or woven form. The solution should penetrate, wet and coat each individual monofilament.

The composites usually contain from 30% up to 70% of graphite fiber reinforcement, typically from 40% to 60% graphite fibers dispersed in the matrix resin. Various resins can be utilized such as epoxy, polyester, phenolic, silicone or polyimide resins. The most widely used and qualified resin are Bisphenol A epoxy resins cured with from 10 to 30% of diamine curing agent hardeners.

The development of the present invention was greatly aided by the development of a conductive fiber test apparatus. Use of this apparatus made it possible to eliminate shorting effects due to carbon debris from the degradation products of the matrix resin and to directly monitor the extent of graphite fiber fragment released during combustion. The detector includes a two layer interlaced comb-grid which allows the combustion products of graphite fiber to pass through but is immune to spurious shorts caused by soot and moisture. The test apparatus provides real-time data on release of graphite fibers during combustion in a propane flame.

Experiments were conducted with Thornel graphite fiber T-300 in the form of a monofilament or multifilament twisted strand of 3000 monofilaments having a diameter of 8 microns.

EXAMPLE 1

T-300 strands were pretreated by heating the fiber in an Argon arc for about thirty (30) minutes at about 1 torr. The fiber was then dipped into a bath of a concentrated aqueous solution of calcium acetate (CaAc), removed and dried to deposit about 2.5% by weight of calcium acetate.

The coated fibers and uncoated T-300 was subjected to thermogravimetric analysis at a heating rate of 20° C./minute. Referring now to FIG. 1, it is observed that $Ca^{++}$ treated fiber demonstrated greatly enhanced rate of degradation (as indicated by the slope of the curve).

EXAMPLE 2

Strands of 67% of calcium acetate coated T-300 fibers prepared according to Example 1 were mixed with 33% of an epoxy resin containing 10% calcium acetate; a second sample was prepared using 67% of untreated and uncoated fibers mixed with 33% of an epoxy resin containing 5% calcium acetate; these prepared composites were used for subsequent burning experiments. In all cases, the epoxy used was an 80/20 mixture of RF-3000/RF-61 (E. V. Roberts Associates, Culver City, Calif.). This resin was applied to the fiber bundle with a spatula, then worked into the fibers with the hand. All excess resin was then squeezed out. The epoxy was then cured for a minimum of 2½ hours at 140° F. Burning tests were also conducted on these untreated composites: an epoxy resin composite and an Ames charing resin.

Two burning tests involved the use of a butane torch (Bernzomatic). The flame was adjusted so that the light blue portion of the flame was approximately 25 mm long. The fibers were held so that the end of the fiber bundle was about one to two millimeters above the tip of the light blue portion of the flame. The escaping fibers and binder debris were drafted up a 75 millimeter diameter glass cylinder and across the bar grid of the electrical detector described earlier. The time interval from heating to the detection of electrical shorts was measured as an indication of electrical hazard. The escaping fibers would short on the grid and caused an integrated reading on a chart recorder. In this text, the number of counts totaled in a given time was used as a quantitative indicator of escaping fibers.

Figure 2:
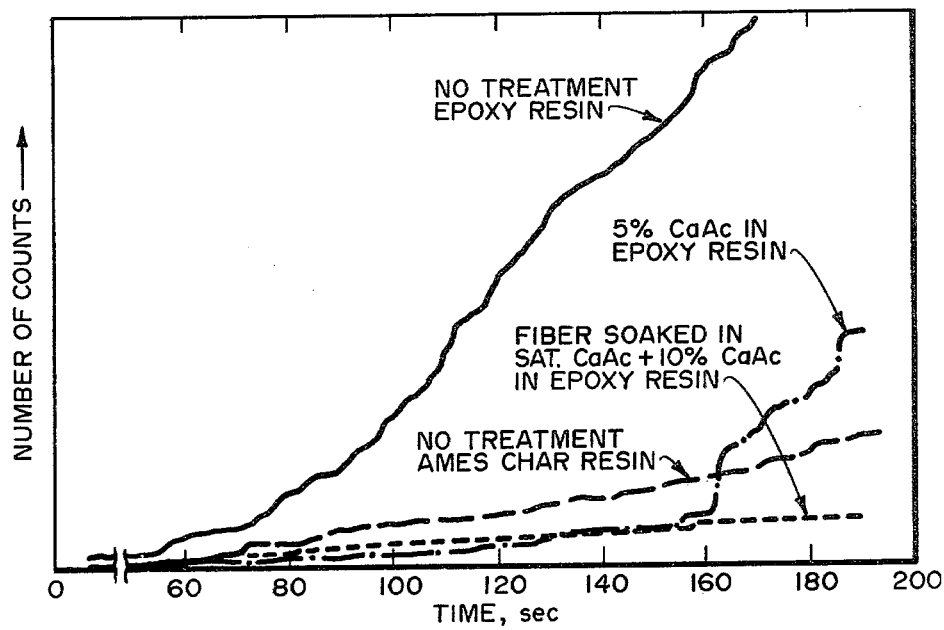
FIG. 2 is a series of burn test curves.

Referring now to FIG. 2, it is seen that the epoxy resin evolved the most fiber counts. The calcium acetate (CaAc) filled resin initially showed low counts which increased significantly after 160 seconds. The treated fiber-CaAc filled composite showed very low counts initially and after 160 seconds.

The composites of Examples 1 and 2 were soaked in water at 180° F. and then subjected to short beam shear stress. The composite containing 10% CaAc and CaAc treated fibers showed smaller loss in shear values than the control (untreated) or the sample containing 5% CaAc in the resin (uncoated fibers) with water treatment. Differential scanning calorimeter (DSC) analysis of the material of Example 1 and of the untreated graphite showed no reaction for the untreated graphite while the coated graphite exhibits large exotherms due to various chemical reactions. Thermogravimetric analysis (TGA) and DSC for calcium acetate (CaAc) shows three stages of reaction which are believed to correlate to evolution of water, evolution of acetone forming $CaCO_3$, and evolution of $CO_2$ to form CaO ash. Autoignition occurs at 467° C. DSC comparison of the alkaline earth metal acetates show that CaAc exhibits the largest exotherm, followed by SrAc, BaAc and MgAc.

The catalytic coated fibers of this invention demonstrate self-sustained fiber gasification to a non-conductive ash. The catalytic coating at small cost and weight penalty provides significant improvement in the alleviation of short circuits in burned graphite composites.

It is to be realized that only preferred embodiments of the invention have been described and that numerous substitutions, modification and alterations are permissible without department from the spirit and scope of the invention as defined in the following claims.

We claim:

1. A composition of matter comprising: graphite fibers having a diameter from 1 to 30 microns coated with 1.0 to 10% by weight of a salt of metal having a work function below 4.2 eV and said fibers being embedded in a binder resin.

2. A composition according to claim 1 in which the fibers are in the form of a multifilament yarn.

3. A composition according to claim 1 in which the coating is present in an amount from 1% to 5% by weight of the fibers.

4. A composition according to claim 1 in which the binder resin is selected from epoxy, polyester, phenolic, silicone or polyimide resins.

5. A composition according to claim 4 in which the resin is an epoxy.

6. A composition according to claim 4 in which the coating material is an alkaline earth metal salt.

7. A composition according to claim 6 in which the anion of the salt is an organic acid.

8. A composition according to claim 7 in which the anion is acetate.

9. A composition according to claim 7 in which the metal is selected from calcium, barium and strontium.

10. A composition according to claim 1 further including 0.1 to 10% by weight of the salt dispersed in the binder resin.

11. A method of forming a gasifiable fiber comprising the steps of:
applying a coating of a salt having a work function below 4.2 eV to the exterior surface of a fine graphite fiber; and dispersing the coated fibers in a binder resin and curing the resin to form a composite.

12. A method according to claim 11 in which the salt is applied to the fiber from a solution and further including the step of drying the solution to form a coating.

13. A method according to claim 11 further including the step of pretreating the fiber by subjecting the fiber to an arc or plasma before applying the solution thereto.

14. A method according to claim 11 further including the step of dispersing 0.1 to 20% by weight of the salt in the binder resin.

* * * * *